(12) United States Patent
Schuler et al.

(10) Patent No.: US 12,473,767 B2
(45) Date of Patent: Nov. 18, 2025

(54) DAMPER

(71) Applicant: Julius Blum GmbH, Hoechst (AT)

(72) Inventors: Thomas Schuler, Hard (AT); Simon Gassner, Lustenau (AT); Bernhard Krammer, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/439,081

(22) Filed: Feb. 12, 2024

(65) Prior Publication Data

US 2024/0183209 A1 Jun. 6, 2024

Related U.S. Application Data

(63) Continuation of application No. PCT/AT2022/060284, filed on Aug. 16, 2022.

(30) Foreign Application Priority Data

Aug. 20, 2021 (AT) .............................. A 50681/2021

(51) Int. Cl.
*E05F 3/12* (2006.01)
*E05F 3/20* (2006.01)
*F16F 13/00* (2006.01)

(52) U.S. Cl.
CPC .................. *E05F 3/12* (2013.01); *E05F 3/20* (2013.01); *F16F 13/007* (2013.01);
(Continued)

(58) Field of Classification Search
CPC ........ E05F 3/12; E05F 3/20; E05Y 2201/256; E05Y 2900/20; F16F 13/007
See application file for complete search history.

(56) References Cited

U.S. PATENT DOCUMENTS 6,981,578 B2 * 1/2006 Leiphart ................ F16F 9/061
188/281
7,600,295 B2 * 10/2009 Zimmer .................... F16F 9/36
16/85

(Continued)

FOREIGN PATENT DOCUMENTS

CN 102287103 12/2011
CN 106678257 5/2017
(Continued)

OTHER PUBLICATIONS

International Search Report issued Feb. 14, 2023 in International (PCT) Application No. PCT/AT2022/060284.

*Primary Examiner* — Jason W San
*Assistant Examiner* — Matthew J Sullivan
(74) *Attorney, Agent, or Firm* — Wenderoth, Lind & Ponack, L.L.P.

(57) ABSTRACT

A damper includes a damper housing, a fluid chamber in the damper housing, a damping fluid in the fluid chamber, a piston displaceable in the fluid chamber, a piston rod connected to the piston, and a volume compensating device in the damper housing. The volume compensating device compensates for a displaceable volume of the damping fluid when the piston rod is immersed into the fluid chamber, and includes a seal to seal the fluid chamber relative to the piston rod and/or relative to an inner wall of the damper housing, a support element to guide the seal, a spring element to reset the seal after a damping stroke at least partially into an initial position. The spring element, the seal, and/or the support element form a common compensating member having an integral one-piece configuration. The compensating member is configured to bear loosely against a cover for closing the damper housing.

24 Claims, 6 Drawing Sheets

(52) U.S. Cl.
CPC ... *E05Y 2201/256* (2013.01); *E05Y 2800/678* (2013.01); *E05Y 2900/20* (2013.01)

(56) References Cited

U.S. PATENT DOCUMENTS

| | | | | |
|---|---|---|---|---|
| 7,845,050 | B2* | 12/2010 | Pyo | F16F 9/3405 16/85 |
| 8,424,161 | B2* | 4/2013 | Sutterlutti | E05F 5/006 16/84 |
| 8,857,579 | B2 | 10/2014 | Cultraro | |
| 8,925,151 | B2* | 1/2015 | Salice | E05F 5/02 16/286 |
| 9,021,656 | B2* | 5/2015 | Brunnmayr | E05F 5/10 16/85 |
| 10,100,896 | B2* | 10/2018 | Spyche, Jr. | F16F 13/007 |
| 10,145,162 | B2* | 12/2018 | Liang | E05F 3/108 |
| 11,230,869 | B2* | 1/2022 | Weber | F16F 13/007 |
| 11,268,589 | B2* | 3/2022 | Zimmer | F16F 9/512 |
| 11,866,986 | B2 | 1/2024 | Waschk | |
| 2006/0207843 | A1* | 9/2006 | Migli | F16F 9/3214 188/282.1 |
| 2009/0271946 | A1* | 11/2009 | Lam | F16F 9/003 16/84 |
| 2012/0205208 | A1* | 8/2012 | Cultraro | F16F 1/37 188/313 |
| 2013/0160242 | A1 | 6/2013 | Brunnmayr | |
| 2018/0355945 | A1* | 12/2018 | De Kock | F16F 9/3488 |
| 2021/0148148 | A1 | 5/2021 | Weber | |
| 2021/0246703 | A1 | 8/2021 | Waschk | |
| 2023/0375014 | A1* | 11/2023 | Rösler | F15B 21/00 |
| 2024/0035326 | A1* | 2/2024 | Kondratuk | E05F 3/14 |
| 2024/0318490 | A1* | 9/2024 | Krammer | E05F 5/02 |
| 2024/0318895 | A1* | 9/2024 | Lee | F25D 23/028 |
| 2024/0328225 | A1* | 10/2024 | Goetz | E05F 3/20 |
| 2024/0353167 | A1* | 10/2024 | Kwon | E05F 3/04 |
| 2024/0353168 | A1* | 10/2024 | Jung | E05D 7/081 |

FOREIGN PATENT DOCUMENTS

| | | | |
|---|---|---|---|
| CN | 111236781 | 6/2020 | |
| CN | 111485783 | 8/2020 | |
| DE | 1 028 002 | 4/1958 | |
| DE | 20219411 U1 * | 10/2003 | ........... A47B 88/047 |
| DE | 10 2007 031 175 | 10/2008 | |
| DE | 20 2018 103 637 | 11/2019 | |
| JP | 51-110175 | 9/1976 | |
| JP | 57-143369 | 9/1982 | |
| JP | 2007-255446 | 10/2007 | |
| JP | 2013-536337 | 9/2013 | |
| JP | 2014-189114 | 10/2014 | |
| JP | 2016-505122 | 2/2016 | |
| JP | 2020-525741 | 8/2020 | |
| JP | 2021-529289 | 10/2021 | |
| WO | WO-2005124185 A1 * | 12/2005 | ............... E05F 5/10 |
| WO | 2012/024711 | 3/2012 | |
| WO | 2019/002130 | 1/2019 | |

* cited by examiner

DAMPER

The present application is a continuation of International Application No. PCT/AT2022/060284, filed Aug. 16, 2022. Thus, all of the subject matter of International Application No. PCT/AT2022/060284 is incorporated herein by reference.

BACKGROUND OF THE INVENTION

The present invention relates to a damper, in particular for furniture fittings, the damper comprising: a damper housing, at least one fluid chamber arranged in the damper housing, a damping fluid arranged in the fluid chamber, at least one piston, preferably linearly, displaceable in the at least one fluid chamber, a piston rod connected to the at least one piston, and at least one volume compensating device arranged in the damper housing. The volume compensating device is configured to compensate for a displaceable volume of the damping fluid when the piston rod is immersed into the fluid chamber. The at least one volume compensating device includes at least one seal configured to seal the fluid chamber relative to the piston rod and/or relative to an inner wall of the damper housing, includes at least one support element configured to guide the at least one seal in the damper housing, and includes at least one spring element configured to reset the at least one seal after a performed damping stroke at least over a region into an initial position. The at least one spring element and the at least one seal and/or the at least one support element are formed together to a common compensating member so as to have an integral one-piece configuration, and at least one cover for closing the damper housing is provided.

Moreover, the invention relates to a furniture fitting, in particular a hinge, for movably supporting a furniture part on a furniture carcass, and the furniture fitting includes at least one damper of the type to be described.

WO 2012/024711 A1 to the present applicant discloses a furniture damper having a damper housing which is insertable into an inner cavity of a furniture hinge and which can be entirely received within the hinge cup in a mounted condition. In the damper housing, a fluid chamber is arranged in which a piston with a piston rod is displaceably guided. By virtue of a volume compensating device, a displaceable volume of the damping fluid can be compensated for when the piston rod is immersed into the fluid chamber. The volume compensating device includes sealing lips for sealing the fluid chamber relative to the piston rod and relative to an inner wall of the damper housing. The volume compensating device further includes an abutment element for supporting and guiding the sealing lips. Moreover, a conical spring is provided, and the additional volume of the piston rod immersing into the fluid chamber can be compensated for by a compression of the conical spring. The more the piston rod is immersed into the fluid chamber, the more the sealing lips are displaced against a force of the conical spring. In this way, the volume of the fluid chamber can be enlarged when the damping stroke is performed, and a rebound of the piston rod and damages to the damper housing (in particular a burst of the damper housing) can be prevented when the damping stroke is performed.

A multi-component construction of a volume compensating device is disclosed in CN 111485783 A.

JP 2007-255446 A discloses a damper with a cylinder, a linearly displaceable piston, a piston rod and a volume compensating device arranged in the cylinder. The volume compensating device is configured to compensate for a displaceable volume of the damping fluid when the piston rod is immersed into the fluid chamber. The volume compensating device includes a seal configured to seal the fluid chamber with respect to the piston rod and with respect to an inner wall of the cylinder. Further provided is a support element for guiding the seal within the cylinder. Moreover, a spring device is provided for resetting the seal at least over a region in a direction of the initial position after the damping stroke. The seal, the support element and the spring device can be arranged so as to be nested into each other.

A drawback with known constructions is the fact that the volume compensating device, in total, requires a relatively large constructional space. Because of the fact that furniture fittings have become more compact over the recent years, a compact construction of the damper as far possible is also a necessary requirement. Moreover, the installation of the volume compensating device is relatively complicated due to the individual components. Also, the usage of a mechanical spring for resetting the seal is connected with increased costs in serial production.

DE 20 2018 103 637 U1 discloses a damper with a cylindrical housing and a piston displaceable within the housing. Further, a volume compensating device is provided for compensating for a displaceable volume of the damping fluid when the piston rod is immersed into the fluid chamber. The volume compensating device includes a seal configured to seal the fluid chamber relative to the piston rod and relative to an inner wall of the housing. Further, a volume compensating element is provided for guiding the seal in the housing. By bendable limbs, the seal can be again resetted after a damping stroke. The volume compensating element and the seal can be formed together so as to have an integral one-piece configuration. The volume compensating element is held on a cover, and the cover closes an end of the housing and forms a passage for the piston rod. Due to the integral one-piece configuration between the cover and the bendable limbs, a torque is applied to the cover upon each damping stroke. Thereby, there is the danger that the cover can be rotated relative to the housing and the hydraulic damping fluid can leak from the housing. With an integral one-piece configuration between the cover and the bendable limbs, also the cover has to be made of an elastic material, whereby further leakage problems of the damper may occur.

SUMMARY OF THE INVENTION

It is an object of the present invention to propose a damper of the type mentioned in the introductory part, thereby avoiding the above-discussed drawbacks.

According to the invention, the compensating member bears loosely or is configured to bear loosely against the at least one cover.

Due to a separate configuration between the compensating member and the cover, a torque is no longer applied to the cover upon a damping stroke. As a result, the danger of leakages can be reduced. Moreover, the compensating member and the cover consist of different materials so that these components can be better adapted to their intended function.

By an integral one-piece configuration of these functional units, a more compact construction of the damper, an easier installation in the factory, and costs in serial production can be reduced.

According to a preferred embodiment, the at least one spring element, the at least one seal and the at least one support element are formed together to a common compensating member so as to have an integral one-piece configuration.

The compensating member can be formed by an elastically bendable or deformable material, preferably rubber or plastic. Preferably, the compensating member is configured as an injection-molded member. In this way, a simple and cost-saving production of the damper can be made possible.

According to an embodiment, the damping fluid includes a hydraulic damping fluid, for example a silicone oil.

The provision of a spring element which, jointly with the at least one seal and/or jointly with the at least one support element combined to a common compensating member, is not an obvious measure in view of the prior art. It is firstly to be noted that a compensating member bearing loosely against the cover element is subjected to a considerable wear due to the occurring sliding friction on the cover. The wear could admittedly be reduced by a harder material of the compensating member. However, the material selection, the hardness and the geometry of the compensating member again have an influence on the friction value of the contact regions, on the leak tightness, on the seal compression and on the setting behavior of the spring element which, of course, depends on the used material of the compensating member. The force of the spring element, in turn, has an influence on the leak tightness, on the internal pressure within the cylinder and, therefore, also on the pressing of the seal.

Accordingly, the used material and the hardness of the compensating member have an influence on all the parameters of the volume compensating device (frictional values, leakproofness, pressing, setting behavior, internal pressure within the cylinder, spring force, etc.). The pressure of the spring element applied to damping fluid via the seal has an impact on the internal pressure within the damper housing. However, the internal pressure within the damper housing, in turn, again has an influence on the frictional values of the seal and on the leak tightness, and the frictional values of the seal also have an influence on the spring force of the seal.

Accordingly, it is to be noted that all relevant parameters of the volume compensating device mutually influence each other. The configuration of the compensating member is very complex, and can only be made possible with common calculation tools of various software providers by vast simplification. For the person skilled in the art, it would thus be significantly easier to provide the seal, the support element and the spring element as components separate from each other, and to precisely choose the material properties of these components with the respect to their indented function (for example by the choice of a spring element made of steel and/or by the choice of a seal made of a suitable plastic material).

BRIEF DESCRIPTION OF THE DRAWINGS

Further details and advantages of the present invention will be explained with the following description of figures, in which.

DETAILED DESCRIPTION OF THE INVENTION

Figure 1:
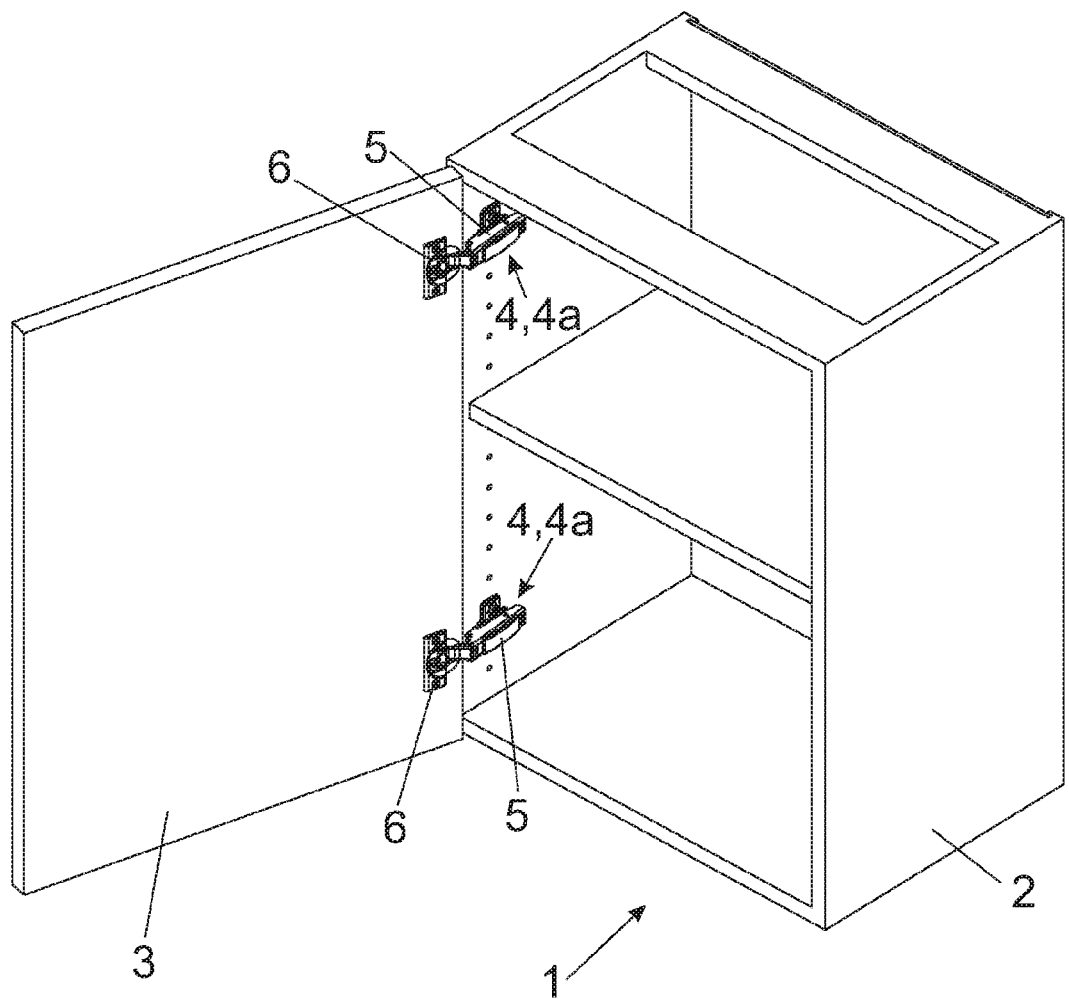
FIG. 1 is a perspective view of an item of furniture with a furniture part and with furniture fittings for movably supporting the furniture part.

FIG. 1 shows a perspective view of an item of furniture 1 comprising a furniture carcass 2, a movable furniture part 3 and furniture fittings 4 (here in the form of hinges 4a) for movably supporting the furniture part 3 relative to the furniture carcass 2.

The furniture fittings 4 include a first fitting portion 5 configured to be fixed to the furniture carcass 2, and a second fitting portion 6 configured to be fixed to the movable furniture part 3. The first fitting portion 5 and the second fitting portion 6 are hingedly connected to each other.

The furniture fitting 4 includes at least one damper 10 (not shown here) configured to dampen a relative movement of the two fitting portions 5, 6 to each other. By the damper 10, at least a closing movement of the furniture part 3 until reaching the fully closed end position relative to the furniture carcass 2 can be dampened.

Figure 2A:
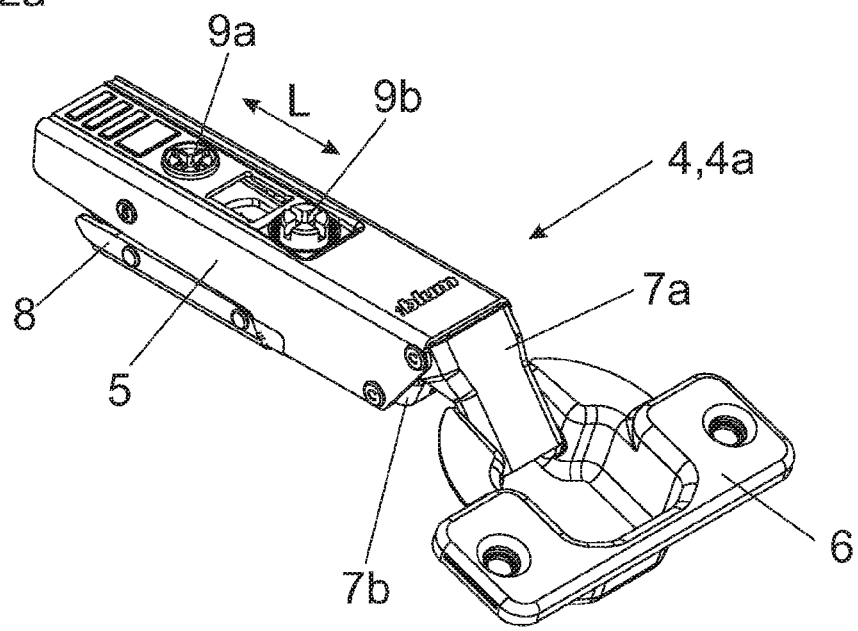
FIG. 2a, 2b show the furniture fitting in the form of a hinge in two different views.

FIG. 2a shows the furniture part 4 in the form of the hinge 4a in a perspective view. According to an embodiment, the first fitting portion 5 includes a hinge arm and/or the second fitting portion 6 includes a hinge cup. The fitting portions 5, 6 are hingedly connected to each other, preferably via at least one hinge lever 7a, 7b.

By a mounting plate 8, the first fitting portion 5 is to be fixed to the furniture carcass 2. The mounting plate 8 and the first fitting portion 5 are configured as components separate from each other. In a first mounting step, the mounting plate 8 is to be fixed to the furniture carcass 2. In a further mounting step, the first fitting portion 5 is lockable to the mounting plate 8 without the use of a tool via a locking device 9 (FIG. 2b) known according to the prior art.

By a first adjustment device 9a, the first fitting portion 5 is adjustable relative to the mounting plate 8 in a longitudinal direction (L) of the mounting plate 8. By a second adjustment device 9b, an inclination of the first fitting portion 5 relative to the mounting plate 8 is adjustable.

Figure 2B:
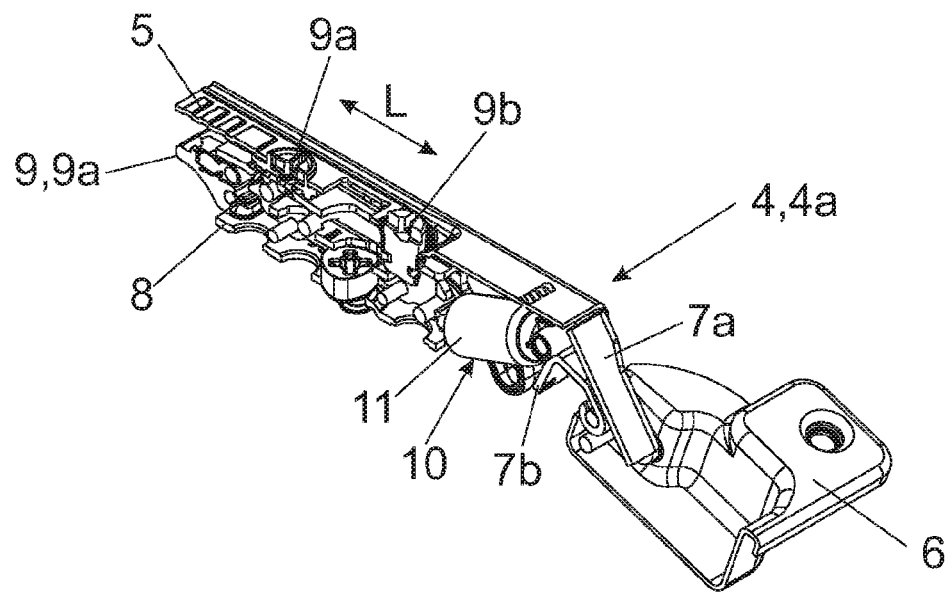

FIG. 2b shows the furniture fitting 4 according to FIG. 2a in a cross-sectional view. A locking device 9 for releasably locking the first fitting portion 5 to the mounting plate 8 can be seen. For example, the locking device 9 can include a spring-loaded tilting lever 9a for releasably locking the first fitting portion 5 to the mounting plate 8.

By a damper 10, a relative movement of the two fitting portions 5, 6 to each other can be dampened. The damper 10 includes a damper housing 11 which, in the shown embodiment, is integrated into the first fitting portion 5. Of course, it is also possible to arrange the damper housing 11 on or within the second fitting portion 6.

Figure 3A:
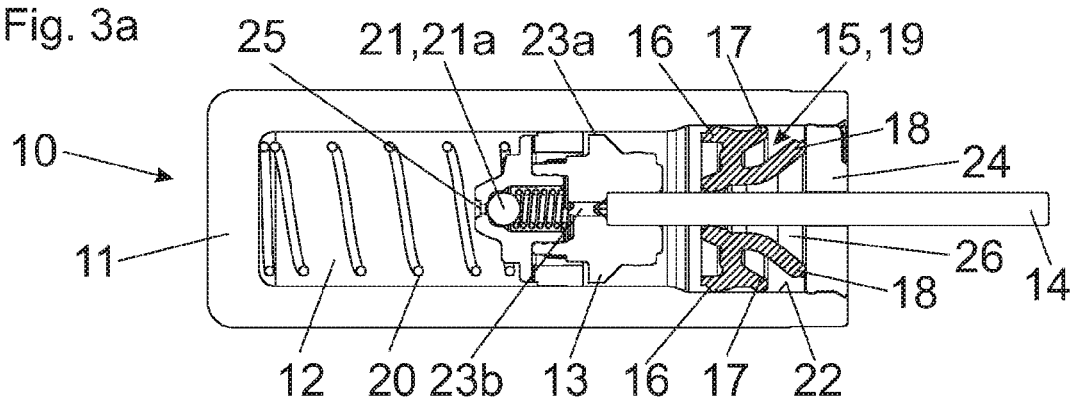
FIG. 3a-3d show a damper in two different embodiments with the piston rod in an extended position and in a retracted position.

FIG. 3a shows a cross-sectional view of a damper 10 having a, preferably cylindrical, damper housing 11 in which at least one fluid chamber 12 for the displaceable support of a piston 13 is arranged. The piston 13 is connected to a piston rod 14. The piston rod 14 is guided through a cover 24 of the damper housing 11.

The piston 13 can be linearly displaceably guided within the fluid chamber 12. Alternatively, it is possible that the piston 13 performs a linear movement and/or a rotational movement within the fluid chamber 12 when performing a damping stroke.

In the shown embodiment, an overload safety device 21 with a spring-loaded ball 21a is provided.

The overload safety device 21 is configured such that at least one overload channel 25 of the piston 13 is closed when a damping stroke is performed below a predetermined threshold value of a pressure application to the piston 13. In such a normal operation, the damping fluid can only stream between a streaming channel 23a formed between the piston 13 and an inner wall 22 of the damper housing 11, and/or through possible further streaming channels of the piston 13, so as to generate a braking force for the piston 13 immersing into the fluid chamber 12.

Above the predetermined threshold value of a pressure application to the piston 13, the spring-loaded ball 21a is movable against a force of a spring so as to unblock the overload channel 25 of the piston 13. In such an overload case, the damping fluid can stream through the overload channel 25 and through a streaming channel 23b of the piston 13. As a result, a rapid pressure reduction within the fluid chamber 12 can be brought about and a damage of the damper 10 can be prevented.

Such overload safety devices 21 are well-known according to the prior art and need not to be described in greater detail here. The overload safety device 21 can also be entirely omitted.

By a volume compensating device 15, a displaceable volume of the damping fluid can be compensated for when the piston rod 14 is immersed into the fluid chamber 12. The volume compensating device 15 is necessary, because the additional volume of the immersing piston rod 14 must be compensated for so as to prevent a bouncing-back movement of the piston rod 14 and a damage of the damper housing 11.

The volume compensating device 15 includes at least one seal 16 which is movable against a force of a spring element 18 when the damping stroke is performed. In this way, the volume of the fluid chamber 12 can be enlarged in a damping stroke, depending on the immersing piston rod 14. By virtue of the seal 16, the fluid chamber 12 can be sealed relative to the piston rod 14 and/or relative to an inner wall 22 of the damper housing 11.

Figure 4A:
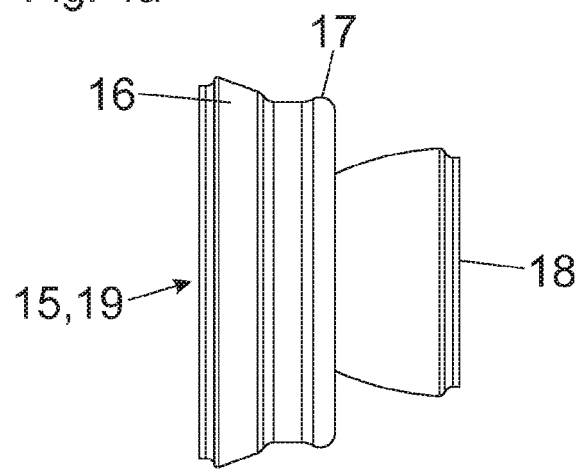
FIG. 4a-4f show different compression conditions of the compensating member in a side view and in a cross-sectional view.
Figure 4B:
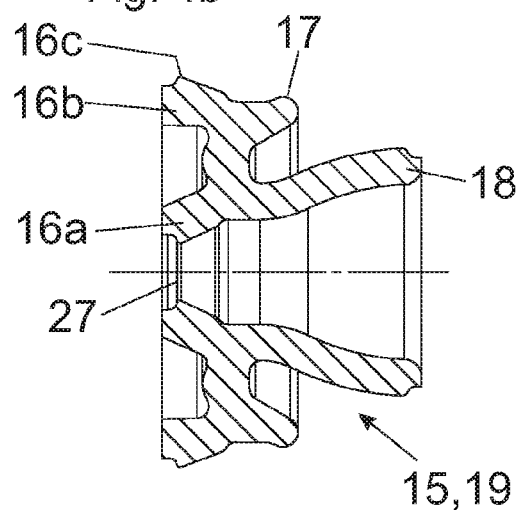
Figure 4C:
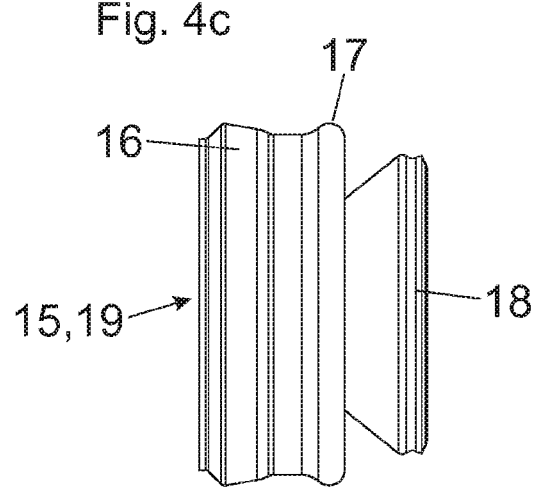
Figure 4D:
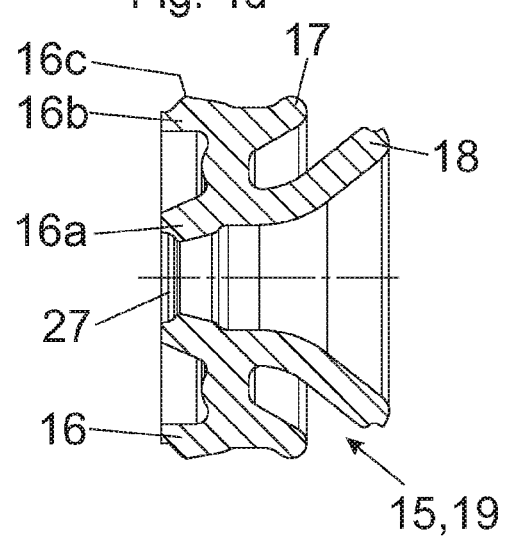
Figure 4E:
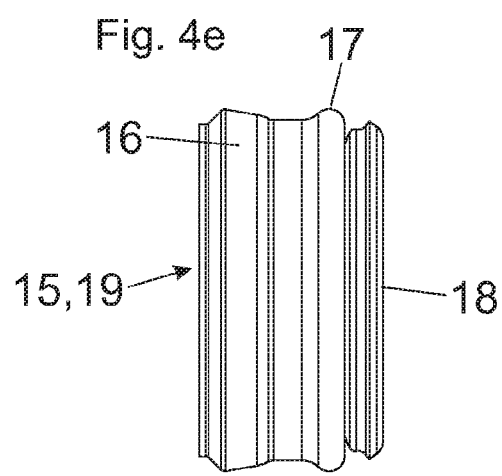
Figure 4F:
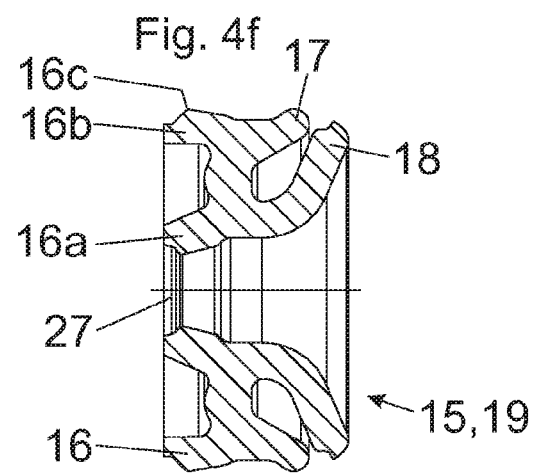

The seal 16 can be guided in the damper housing 11 via at least one support element 17. In this way, the seal 16 can be stably guided, in addition to a sealing lip 16c (FIG. 4b) bearing against the inner wall 22 of the damper housing 11.

After the damping stroke has been performed, the seal 16 can be at least partially reset in a direction of the initial position by a spring element 18.

According to the invention, the at least one spring element 18, jointly with the at least one seal 16 and/or jointly with the at least one support element 17, is formed together to a common compensating member 19 so as to have an integral one-piece configuration.

The compensating member 19 and the at least one piston 13 can be arranged in the damper housing 11 behind each other in a longitudinal direction of the piston rod 14.

In the shown figures, the compensating member 19 is arranged in the damper housing 11 between the at least one fluid (a first) chamber 12 and an air (a second) chamber 26.

According to a preferred embodiment, the at least one spring element 18, the at least one seal 16, and the at least one support element 17 are formed together to a common compensating member 19 so as to have an integral one-piece configuration.

According to a preferred embodiment, the at least one spring element 18 of the compensating member 19 is partially pre-stressed in the initial position. Accordingly, the spring element 18 is thus already assembled into the damper housing 11 with a certain bias. The bias of the spring element 18 is again dissipated over time due to a possible loss of hydraulic (liquid) damping fluid. In other words, the seal 16 can move up by a force of the spring element 18 in a direction of the piston 13 upon a loss of the damping fluid. Therefore, the loss of the damping fluid can be compensated for, and the volume of the fluid chamber 12 can be held constant.

Figure 3B:
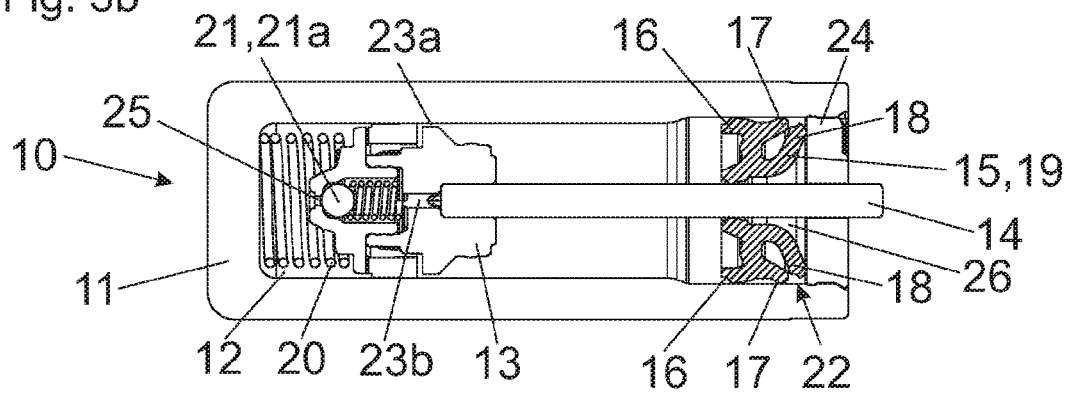

FIG. 3b shows the damper 10 according to FIG. 3a with a piston rod 14 immersed (protruding) into the fluid (first) chamber 12. The additional volume of the piston rod 14 within the fluid first) chamber 12 is compensated for, because the seal 16 is moved and/or deformed against the force of the spring element 18 so as to enlarge the volume of the fluid chamber 12. On a basis of a direct comparison between FIG. 3a and FIG. 3b, the different degree of deformation of the spring element 18 can be well seen.

The compensating member 19 bears or is configured to bear against the at least one cover 24. As shown in FIGS. 3a-3d, the compensating member 19 bears directly against the cover 24.

According to preferred embodiments,
the at least one spring element 18 is supported on the at least one cover 24, and/or
the at least one cover 24 includes an opening for the passage of the piston rod 14, and/or
the at least one cover 24 is configured substantially cylindrical.

By a return spring 20, the piston 13 is pre-stressed in a direction of the extended (ready) position (i.e., extending out of the damper housing 11). Therefore, the piston 13 can be at least partially reset again in a direction of an extended ready-position after a damping stroke. However, the return spring 20 can also be arranged outside the damper housing 11, or can be entirely omitted.

Figure 3C:
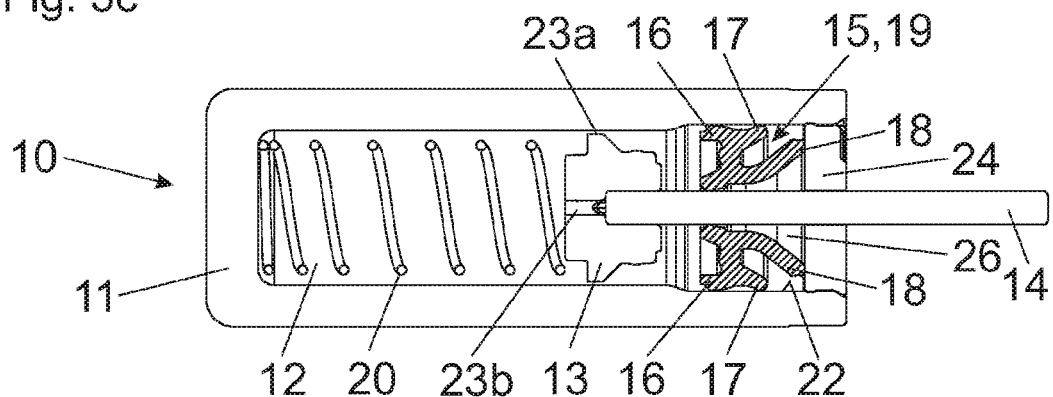

FIG. 3c shows the damper 10 according to FIG. 3a, with the difference that the overload safety device 21 integrated into the piston 13 is omitted. FIG. 3c shows the damper 10 with the piston rod 14 in an extended (ready) position.

At least one streaming channel 23a, 23b is provided which, upon a displacement of the piston 13, can be streamed through by the damping fluid. With the embodiment shown in FIGS. 3c, 3d, the damping fluid can flow through the first streaming channel 23a formed between the piston 13 and the inner wall 22 of the damper housing 11, and can also flow through the second streaming channel 23b of the piston 13.

Figure 3D:
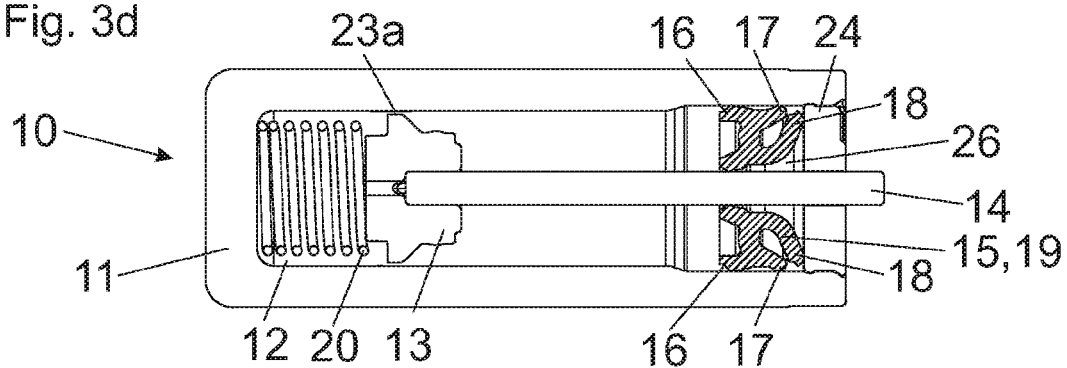

FIG. 3d shows the damper 10 according to FIG. 3c in a retracted (damping) position of the piston rod 14 (i.e., a position in which the piston rod 14 has performed a damping movement to protrude into the fluid chamber 12). It can be seen that the compensating member 19 is at least partially compressible when the damping stroke is performed.

FIG. 4a-4f show different compressing conditions of the compensating member 19 of the volume compensating device 15 in a side view and in a cross-sectional view. An outer contour of the compensating member 19, in a resting condition, can be configured substantially rotationally symmetrical.

With possible embodiments:
the at least one spring element 18 of the compensating member 19 is configured substantially funnel-shaped in a cross-section, and/or the at least one seal 16 of the compensating member 19 is configured substantially U-shaped in a cross-section, preferably wherein a first limb 16a of the U-shape bears against the piston rod 14 and/or a second limb 16b of the U-shape bears against the inner wall 22 of the damper housing 11, and/or the at least one seal 16 of the compensating member 19 includes at least one sealing lip 16c glidingly guided along the inner wall 22 of the damper housing 11, preferably wherein the at least one sealing lip 16c and the at least one support element 17 are spaced apart from each other in a longitudinal direction of the piston rod 14, and/or the at least one support element 17 of the compensating member 19 is configured substantially wedge-shaped in a cross-section, preferably wherein a tip of the wedge-shape is supportable on the inner wall 22 of the damper housing 11.

According to further embodiments, the compensating member 19;

includes at least one, preferably central, opening 27 for the passage of the piston rod 14, and/or is displaceably supported on the piston rod 14.

Figure 5A:
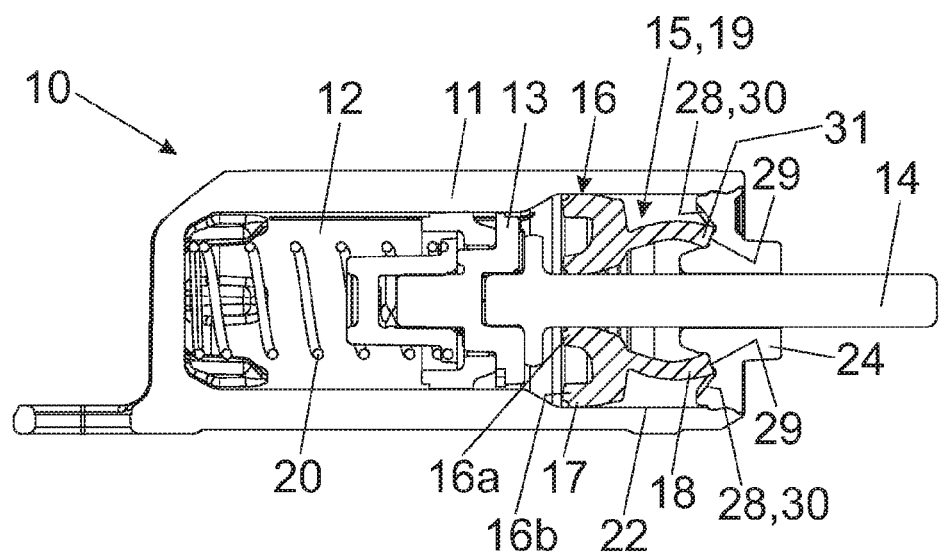
FIG. 5a, 5b show a further embodiment of a damper with the piston rod in an extended position and in a retracted position.

FIG. 5a shows a further embodiment of a damper 10 with the damper housing 11, a fluid chamber 12 arranged in the damper housing 11, a piston 13 displaceable within the fluid chamber 12, and a return spring 20 for resetting the piston 13.

The volume compensating device 15 includes a compensating member 19 having an integral one-piece configuration, the compensating member 19 including the seal 16, the support element 17 and the spring element 18.

The cover 24 has an inner side 28 facing into the damper housing 11, and at least one convex contour 29 is arranged on the inner side 28 of the cover 24. An end 31 of the at least one spring element 18 is pivotally supported on the convex contour 29, and/or an inclined surface 30 is arranged on the inner side 28 of the cover 24, and an outer side of the at least one spring element 18, in a compressed condition, can bear against the inclined surface 30.

Due to the convex contour 29 arranged on the inner side 28 of the cover 24, it can be ensured that the end 31 of the spring element 18 bearing loosely against the cover 24 has a defined pivoting axis on the cover 24 when the damping stroke is performed. In this way, an unnecessary sliding friction of the spring element 18 on the cover 24 can be prevented.

Due to the inclined surface 30 arranged on the inner side 28, it can be ensured that the spring element 18 receives a defined bearing surface on the cover 24 when the damping stroke is performed, and/or that a preferred direction for the bulging of the spring element 18 can be determined.

Figure 5B:
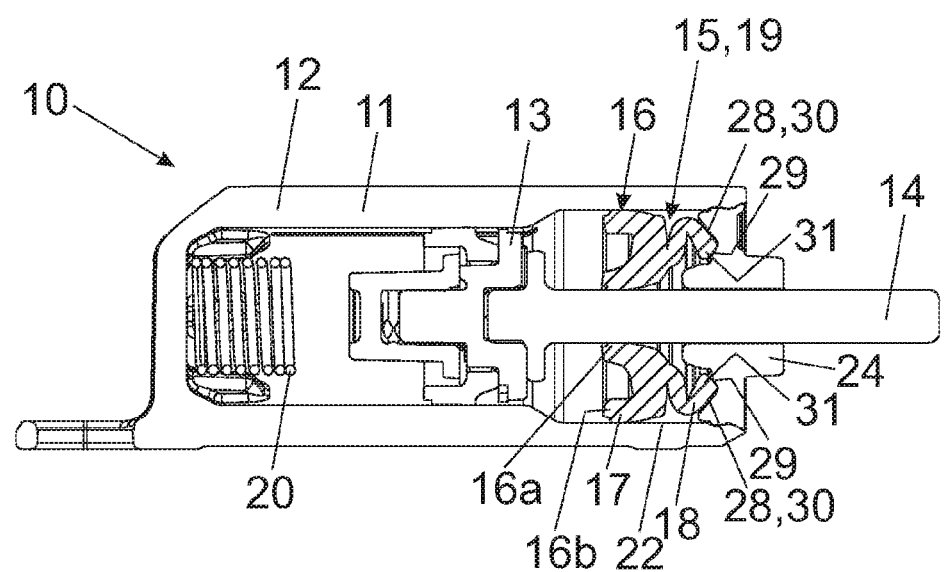

FIG. 5b shows the damper 10 according to FIG. 5a with the piston rod 14 in a retracted position. By the volume compensating device 15, a displaceable volume of the damping fluid can be compensated for when the piston rod 14 is immersed into the fluid chamber 12.

It can be seen that the end 31 of the spring element 18 bearing against the inner side 28 of the cover 24, when the damping stroke is performed, has been pivoted about an axis formed by the convex contour 29, and/or that a partial portion, preferably a free end 31, of the spring element 18, in a compressed condition, bears against the inclined surface 30 of the cover 24.

Figure 6A:
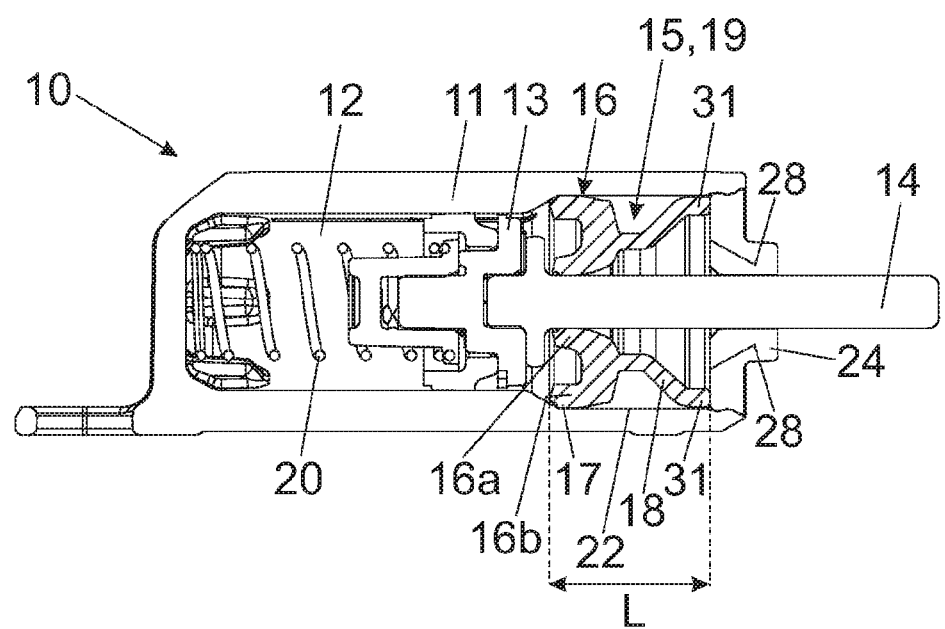
FIG. 6a, 6b show a further embodiment of a damper with the piston rod in an extended position and in a retracted position.

FIG. 6a shows a further embodiment of a damper 10, in which the piston rod 14 is located in an extended position relative to the damper housing 11 (i.e., extending out of the damper housing 11). It can be seen that a free end 31 of the compensating member 19 bears against the inner side 28, preferably on an outermost edge, of the cover 24, and/or is configured to bear against an inner wall 22 of the damper housing 11.

As with all other embodiments of the invention, the at least one spring element 18 of the compensating member 19:

includes a substantially closed circumferential surface in a radial direction, and/or has a length L in an axial direction, the length L being not more than twice as large than the length of the remaining components of the compensating member 19.

Figure 6B:
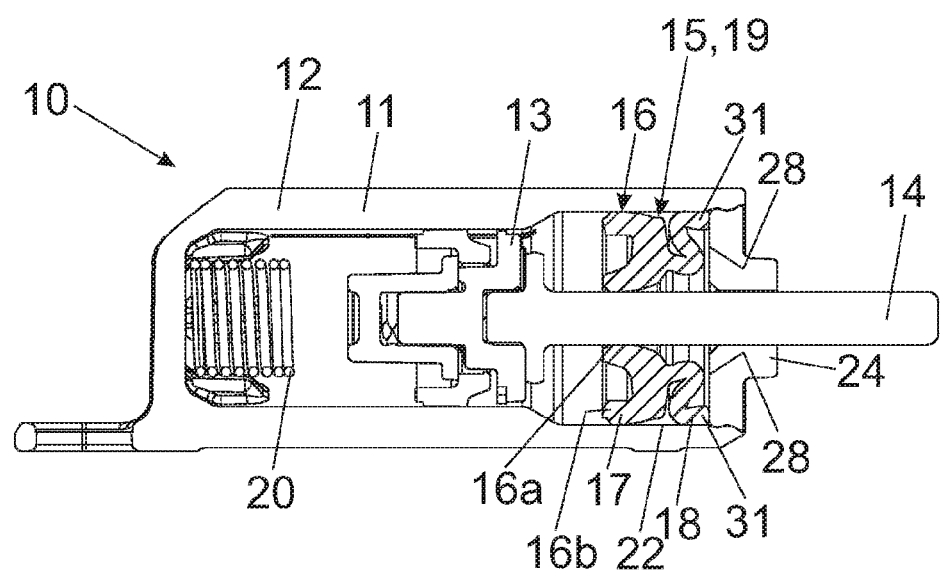

FIG. 6b shows the damper 10 with the piston rod 14 in a retracted position relative to the damper housing 11. According to a preferred embodiment, the end 31 of the compensating member 19 bears against the inner side 28, preferably on an outermost edge, of the cover 24 in all operating positions, and/or is supportable on an inner wall 22 of the damper housing 11.

The invention claimed is:

1. A damper, in particular for furniture fittings, comprising:

a damper housing, a fluid chamber arranged in the damper housing, a damping fluid in the fluid chamber, a piston, displaceable in the fluid chamber, a piston rod connected to the piston, a cover for closing the damper housing, a volume compensating device arranged in the damper housing, the volume compensating device being configured to compensate for a displaceable volume of the damping fluid when the piston rod is projected into the fluid chamber, wherein the volume compensating device includes:

a seal configured to seal the fluid chamber relative to the piston rod and/or relative to an inner wall of the damper housing, a support element configured to guide the seal in the damper housing, a spring element configured to at least partially reset the seal into an initial position after a damping stroke, wherein the spring element and the seal and/or the support element are joined together to form a common compensating member having an integral one-piece configuration, wherein the compensating member bears directly against the cover.

2. The damper according to claim 1, wherein:

the spring element is supported on the cover, and/or the cover includes an opening for the passage of the piston rod, and/or the cover is substantially cylindrical, and/or the cover includes an inner side facing into the damper housing, a convex contour being arranged on the inner side of the cover, and an end of the spring element is being pivotally supported on the convex contour, and/or whereinan inclined surface being arranged on the inner side of the cover, and an outer side of the spring element, bearing against the inclined surface in a compressed condition.

3. The damper according to claim 1, wherein the compensating member and the piston are arranged in the damper housing behind each other in a longitudinal direction of the piston rod.

4. The damper according to claim 1, wherein the spring element, the seal, and the support element are joined together to form the common compensating member having the integral one-piece configuration.

5. The damper according to claim 1, wherein the compensating member is an injection-molded member.

6. The damper according to claim 1, wherein the compensating member is formed of an elastically bendable or deformable material.

7. The damper according to claim 1, wherein:
the spring element of the compensating member is substantially funnel-shaped in a cross-section, and/or
the seal of the compensating member is substantially U-shaped in a cross-section, and/or
the seal of the compensating member includes a sealing lip glidingly guided along the inner wall of the damper housing, and/or
the support element of the compensating member is substantially wedge-shaped in a cross-section.

8. The damper according to claim 1, wherein an outer contour of the compensating member is substantially rotationally symmetrical when in a resting condition.

9. The damper according to claim 1, wherein the fluid chamber is a first fluid chamber, the damper further comprising a second fluid chamber containing air, the compensating member being arranged in the damper housing between the first fluid chamber and the second fluid chamber.

10. The damper according to claim 1, wherein the compensating member:
includes an opening for the passage of the piston rod, and/or
is displaceably supported on the piston rod.

11. The damper according to claim 1, wherein the compensating member is at least partially compressible when the damping stroke is performed.

12. The damper according to claim 1, wherein the spring element of the compensating member:
is at least partially pre-stressed in the initial position, and/or
includes a free end facing towards the cover, the free end being configured to be supported on an inner wall of the damper housing, and/or
includes a substantially closed circumferential surface in a radial direction, and/or
has a length in an axial direction not more than twice as large as a length of the remaining components of the compensating member in the axial direction.

13. The damper according to claim 1, further comprising a streaming channel configured such that, upon a displacement of the piston, the damping fluid streams therethrough.

14. A furniture fitting formed as a hinge for movably supporting a furniture part on a furniture carcass, the furniture fitting comprising the damper according to claim 1.

15. The furniture fitting according to claim 14, further comprising at least two fitting portions hingedly connected to each other, wherein the damper is at least partially arranged in one of the at least two fitting portions.

16. The damper according to claim 1, wherein the piston is linearly displaceable in the fluid chamber in the damper housing.

17. The damper according to claim 6, wherein the compensating member is formed of rubber or plastic.

18. The damper according to claim 7, wherein:
the seal of the compensating member is substantially U-shaped in a cross-section, and a first limb of the U-shaped seal bears against the piston rod and/or a second limb of the U-shaped seal bears against the inner wall of the damper housing, and/or
the support element of the compensating member is substantially wedge-shaped in a cross-section, and a tip of the wedge-shaped support element is supported on the inner wall of the damper housing.

19. The damper according to claim 10, wherein the compensating member includes a central opening for the passage of the piston rod.

20. The damper according to claim 12, wherein the spring element of the compensating member includes a free end facing towards the cover, the free end being configured to be supported on an inner wall of the damper housing in all operating positions of the compensating member.

21. The furniture fitting according to claim 15, wherein the damper is entirely arranged in one of the at least two fitting portions.

22. A damper comprising:
a damper housing,
a fluid chamber arranged in the damper housing,
a damping fluid in the fluid chamber,
a piston displaceable in the fluid chamber,
a piston rod connected to the piston,
a cover for closing the damper housing,
a volume compensating device arranged in the damper housing, the volume compensating device being configured to compensate for a displaceable volume of the damping fluid when the piston rod is projected into the fluid chamber, wherein the volume compensating device includes:
a seal configured to seal the fluid chamber relative to the piston rod and/or relative to an inner wall of the damper housing,
a support element configured to guide the seal in the damper housing,
a spring element configured to at least partially reset the seal into an initial position after a damping stroke,
wherein the spring element and the seal and/or the support element are joined together to form a common compensating member having an integral one-piece configuration,
wherein the compensating member is configured to bear loosely against the cover, and
wherein the cover includes an inner side facing into the damper housing, a convex contour being arranged on the inner side of the cover, and an end of the spring element being pivotally supported on the convex contour, and/or an inclined surface being arranged on the inner side of the cover, and an outer side of the spring element bearing against the inclined surface in a compressed condition.

23. A damper comprising:
a damper housing,
a fluid chamber arranged in the damper housing,
a damping fluid in the fluid chamber,
a piston displaceable in the fluid chamber,
a piston rod connected to the piston,
a cover for closing the damper housing,
a volume compensating device arranged in the damper housing, the volume compensating device being configured to compensate for a displaceable volume of the damping fluid when the piston rod is projected into the fluid chamber, wherein the volume compensating device includes:
a seal configured to seal the fluid chamber relative to the piston rod and/or relative to an inner wall of the damper housing,
a support element configured to guide the seal in the damper housing, a spring element configured to at least partially reset the seal into an initial position after a damping stroke, wherein the spring element and the seal and/or the support element are joined together to form a common compensating member having an integral one-piece configuration, wherein the compensating member is configured to bear loosely against the cover, and wherein the spring element of the compensating member is substantially funnel-shaped in a cross-section.

24. A damper comprising:

a damper housing,
a fluid chamber arranged in the damper housing,
a damping fluid in the fluid chamber,
a piston displaceable in the fluid chamber,
a piston rod connected to the piston,
a cover for closing the damper housing,
a volume compensating device arranged in the damper housing, the volume compensating device being configured to compensate for a displaceable volume of the damping fluid when the piston rod is projected into the fluid chamber, wherein the volume compensating device includes:

a seal configured to seal the fluid chamber relative to the piston rod and/or relative to an inner wall of the damper housing, a support element configured to guide the seal in the damper housing, a spring element configured to at least partially reset the seal into an initial position after a damping stroke, wherein the spring element and the seal and/or the support element are joined together to form a common compensating member having an integral one-piece configuration, wherein the compensating member is configured to bear loosely against the cover, and wherein the support element of the compensating member is substantially wedge-shaped in a cross-section, and a tip of the wedge-shaped support element is supported on the inner wall of the damper housing.

* * * * *